Feb. 13, 1951 L. C. PEDDICORD 2,541,829
SHARPENER FOR DISK PLOWS AND THE LIKE
Filed June 6, 1949 2 Sheets-Sheet 1
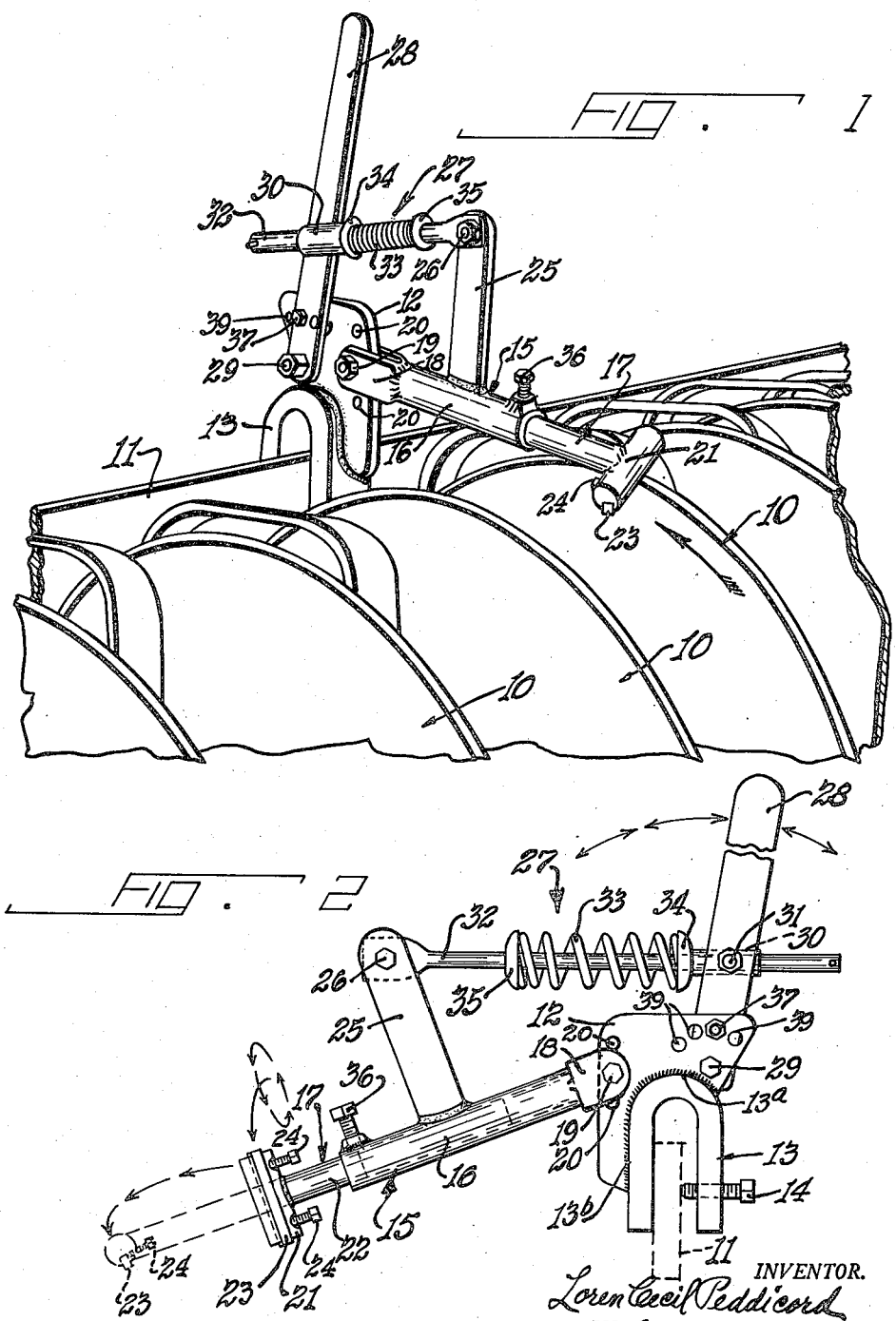
INVENTOR.
Loren Cecil Peddicord
BY
Frank J. Schraeder Jr.
ATTORNEY.

Feb. 13, 1951 L. C. PEDDICORD 2,541,829
SHARPENER FOR DISK PLOWS AND THE LIKE
Filed June 6, 1949 2 Sheets-Sheet 2

INVENTOR.
Loren Cecil Peddicord
BY Frank J. Schraeder Jr.
ATTORNEY.

Patented Feb. 13, 1951

2,541,829

UNITED STATES PATENT OFFICE 2,541,829

SHARPENER FOR DISK PLOWS AND
THE LIKE

Loren Cecil Peddicord, Garden City, Kans.

Application June 6, 1949, Serial No. 97,368

8 Claims. (Cl. 76—85)

My invention relates to new and improved disc sharpening devices and has among its objects to provide a device which may be quickly and easily detachably secured to disc plows, disc harrows and the like implements for the purpose of sharpening the beveled faces of the peripheral cutting edges of the discs while the implement is in use; the device being particularly adaptable for sharpening the edges of discs of the well known "One Way" disc plow.

Sharp discs afford cutting of straw and top growth more readily and penetrate the soil deeper more easily with less required tractive power.

Another object of the invention resides in the provision of an improved sharpener for ground tilling implement discs which is of durable and simple construction, efficient in operation, and capable of manufacture at comparatively low cost.

In the attached drawings, which illustrate preferred embodiments of the invention, like reference characters designate like or corresponding parts or members.

Referring to the drawings:

Figure 1 illustrates, in perspective view, a disc sharpening device embodying my invention and shown for illustrative purposes applied to sharpening one of the discs of a disc-type plow; the discs and a disc-carrying bar being shown in fragmentary view.

Figure 2 is a side elevational view of the sharpening device shown in Figure 1.

Figure 3:
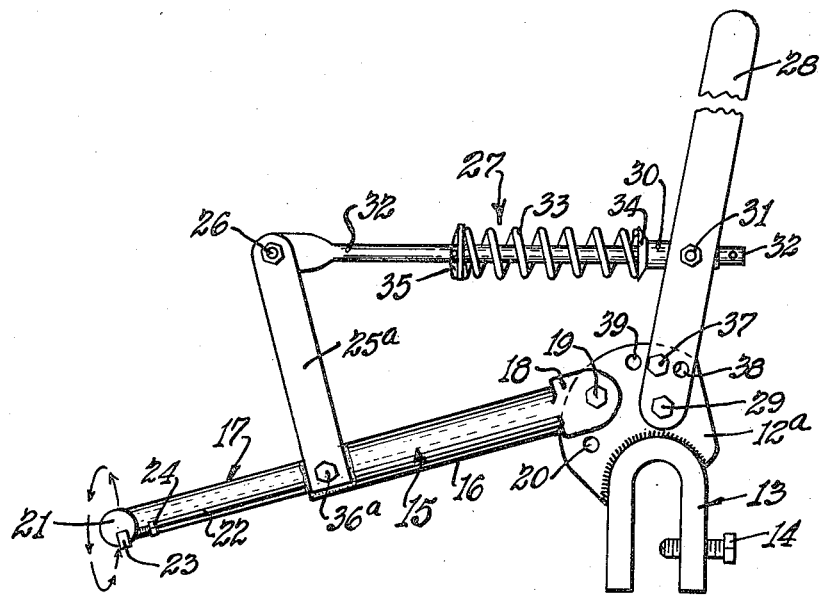
Figure 3 is a side elevational view of a slightly modified form of my invention.

Referring to Figures 1 and 2, the plow discs, which usually are of dished configuration, are designated by numeral 10 and are suitably supported on a disc-carrying bar 11.

The disc sharpening device, as shown in Figures 1 and 2, consists of a suitable support 12 preferably in the form of a flat, plate-like, upstanding member of suitable thickness to provide the required strength and rigidity demanded by a device of this character.

The supporting member 12 is provided with suitable clamping means for detachably securing the device to the disc-carrying frame member 11. In the present instance, the clamping means is illustrated as preferably consisting of an inverted U-shaped clamp member 13 provided with one or more securing screws 14 in one leg thereof. The supporting member 12 may be secured to the clamp 13 in any suitable manner. I have preferred to show the supporting member 12 as extending upwardly from and welded to an upper arcuate portion 13a and to an outer side portion 13b of one leg of the clamp member 13. I have found that the inverted U-shaped clamp 13 provided with two securing screws 14 is well adapted to securely hold the sharpening device on a plow having a disc-carrying frame member in the form of bar 11 of rectangular cross-section.

Since the disc-carrying frame members of some tilling implements are made of structural angle iron and in others of cylindrical pipes, it is obvious that the supporting member 12 may be readily provided with suitable clamping means adapted to rigidly secure the device to angle iron or pipe type disc-carrying frame members.

As shown in Figures 1 and 2, I provide a disc-sharpening tool holder which is generally designated by numeral 15 and which comprises a preferably longitudinally adjustably extensible member consisting of a tubular arm 16 and a tool-carrying extension generally designated by numeral 17 which is telescopically mounted in the outer end of the tubular arm 16.

The tubular arm 16 is bifurcated at its inner end to embrace the plate support, as at 18, for pivotal support on the pivot bolt 19 which is adapted for insertion in either one of the holes 20 of the support 12.

The tool-carrying extension 17 consists of tool-retaining head 21 welded or otherwise secured to the outer end of a shank 22 which is adjustably slidably and rotatively mounted within the tubular arm 16 and is adapted to be held securely in selectively adjusted position within the arm 16 by a set screw 36 carried near the outer end of arm 16.

The tool-retaining head 21 extends transversely to the longitudinal axis of arm 16 and to its shank 22 to which it is rigidly connected intermediate its ends and the head 21 is adapted to securely hold a suitable disc-sharpening tool or instrumentality, preferably, the head 21 is longitudinally slotted to receive a disc sharpener 23 consisting of an elongated bar of tool steel of square cross-section which is suitably secured to the head 21 as by set screws 24.

The arm 16 of the disc-sharpening tool holder 15, is also provided with an upwardly extending ear 25 preferably welded at its lower end to the arm 16 in a plane intersecting the longitudinal center-line of the tubular arm 16 and containing a perforation at its outer end for a connection bolt 26.

Yieldable and adjustable pressure-exerting means, generally designated by numeral 27, is provided for yieldingly exerting pressure against the disc-sharpening holder 15 while the disc sharpening tool 23 is held against the peripheral edge of a disc 10 during the sharpening operation of same.

The pressure-exerting means comprises a manually adjustable handle 28 pivotally mounted at its lower end on pivot bolt 29 carried on the support 12, a sleeve 30 having a stud bolt 31 pivotally carried on the handle 28 for pivotally supporting the sleeve 30 on the handle 28, a rod 32 slidably carried at one end within the sleeve 30 and at its opposite end pivotally connected by bolt 26 to the ear 25, and including a pressure-exerting helical spring 33 on the rod 32 having one end in abutment with a washer 34 which is in engagement with and retained by one end of sleeve 30 while the other end of spring 33 is in abutment with a washer 35 securely fixed to the rod 32. The spring 33 constituting means for exerting yielding pressure against the disc-sharpening tool holder 15 interposed between the adjustable handle and the disc-sharpening tool holder 15.

In operation, the clamp 13 is first securely clamped, as by screws 14, to the disc-carrying bar 11 whereupon the disc-sharpening tool holder arm 16 and its extension 17 are then so adjusted to properly present one of the sharp corner edges the tool steel cutter bar 23 against the beveled face of the peripheral cutting edge portion of the disc to be sharpened.

The tool holder may be adjusted by raising or lowering the pivotal end of arm 16 to suit the diameter of the disc to be sharpened by simply inserting the pivot bolt 19 within a selected one of the several holes 20. The extension 17 being slidably and rotatively adjustable for proper angular engagement of the sharp corner edge of the tool steel cutter bar 23 with the beveled peripheral cutting edge portion of the disc 10 and when so adjusted may be retained in such adjusted position by the set screw 36.

Having adjusted the disc-sharpening tool holder 15 to the peripheral edge portion of the disc 10, pressure against the cutter bar 23 is then applied by swinging the handle 28 forwardly to thereby compress the spring 33 whereupon the pressure from the compressed spring 33 is transmitted from rod 32 through ear 25 and through the tool holder 15 to the cutter 23 against the beveled peripheral edge of the disc 10.

The cutter bar 23 having been adjustably positioned against the edge of the disc 10, a forward movement of the handle 28 will cause the sleeve 30 and the adjacent washer 34 to slide forwardly on the stationary rod 32 to compress the spring 33 between the slidably movable washer 34 and the stationary washer 35 to thereby transmit the force of the compressed spring through the washer 35, rod 32 and ear 25 to the tool holder 15.

As the implement is pulled forwardly during its ground-tilling operation, the discs 10 will be rotated through their engagement with the ground thereby sharpening the disc to which the device is applied. During the disc-sharpening operation while the implement is in use performing its tilling, the cutter bar's corner edge is in constant pressure engagement with the beveled peripheral edge of the disc which is being sharpened.

A desirable range of selectively variable pressures against the cutter 23 is afforded through the arc of movement of the pivoted handle 28. Having moved the handle forwardly to obtain the desired pressure against the cutter 23, a retaining bolt 37 is then inserted through a hole 38 provided for same in the handle and through one of the several holes 39 provided in the support 12 to thus retain the handle in such pressure-adjusted position.

A finer adjustment of the spring 33 is afforded by the provision of two holes 38 in the handle 28 as shown in Figure 3.

In the modified form of the device shown in Figures 3 and 4, the elements and features which are similar to those above described in connection with the illustrations in Figures 1 and 2 are designated by like reference characters. The modifications employed in the construction of the disc sharpener shown in Figs. 3 and 4 consists in mounting the holder 15 and the pressure-exerting means 27 on the support 12$^a$ as a unit relatively angularly to the common axis of the discs 10 so that the longitudinal axes of the holder 15 and the pressure-exerting means 27 are disposed in a plane which is perpendicular to the plane of the beveled face of the peripheral cutting edge of the disc 10 at the line of contact of the cutting edge of the disc sharpener 23 to thereby obtain a more direct thrust of the device against the beveled face of the peripheral cutting edge of the disc.

Figure 4:
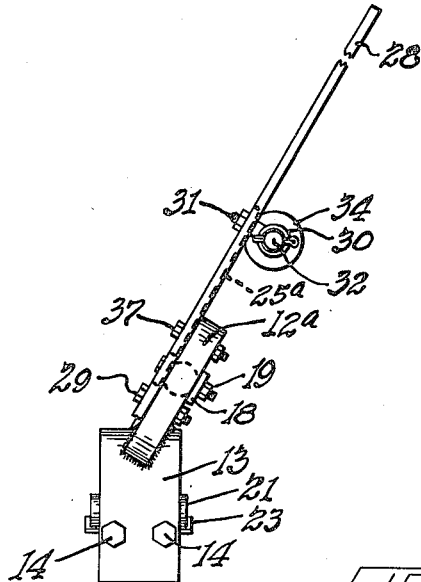
Figure 4 is an end view of the disc sharpening device shown in Figure 3.

Still another difference between the two forms of the invention is found in the mounting of the ear 25$^a$ on one side of the tubular arm 16 instead of centrally to the top thereof as shown in Figures 1 and 2 thereby bringing the handle 28 into more direct alignment with the ear 25$^a$ longitudinally of the operative parts of the device as shown more clearly in Figures 3 and 4.

The yieldably applied pressure against the disc-sharpening tool 23 permits same to follow and constantly contact the beveled face of the peripheral cutting edge of the disc during its rotation even though the edge portions of the disc may be bent out of a true circle as at times some discs have undulating edges caused by impact with hard materials such as stones.

The tool-carrying extension 17 is slidably and rotatively adjustable within the arm 16 to provide the desired angular position of the cutter bar 23 wherein the disc-sharpening edge thereof is disposed in parallel alignment and contact with the beveled face of the peripheral cutting edge of the disc; the set screw 36$^a$ providing means for securing the extension 17 in such adjusted position.

As is well known to those skilled in the art to which this invention appertains, the ground-tilling circular discs employed on plows and harrows are mounted for rotation on a suitable metallic frame. This disc-carrying frame is constructed from various structural steel or iron elements such as bars, angle irons and steel pipe, and, the constructions of these disc-carrying frames vary in design in the various makes of ground-tilling implements now being manufactured and sold. It is therefore obvious that my invention may be readily designed with suitable mounting and clamping means for securing the disc-sharpennig device to structural frame elements of different cross-sections.

For simplicity of illustration, I prefer to show one of the structural elements of the disc-carrying frame in the form of an elongated bar designated by numeral 11 which is also described as a disc-carrying frame member.

The bar 11 is shown as consisting of rectangular cross-section and the clamping element conveniently is illustrated as consisting of an inverted U-shaped member designated by numeral 13.

Various changes in the construction and arrangement of the parts and members, shown for illustrative purposes in preferred embodiments in the attached drawings, may be readily made by those skilled in the art to which this invention appertains without departing from the spirit of my invention which is defined in the appended claims.

I claim as my invention:

1. A device for sharpening ground tilling discs which are rotatably carried on a supporting frame of a farm implement, said device comprising clamping means for detachably securing the device to a member of said disc-carrying frame, a support carried on said clamping means, a longitudinally extensible disc-sharpening tool holder comprising a pair of telescoped members pivotally mounted at one end on said support including a disc-sharpening tool at the free end of the extensible one of said members adapted to engage a peripheral edge portion of one of said discs, and yieldable pressure-exerting means extending between and carried on said support and said holder for yieldably pressing said tool against the peripheral edge portion of the disc during the rotation and sharpening of the disc as the implement is propelled over the ground, wherein said yieldable pressure-exerting means comprises a manually adjustable handle pivotally mounted on said support, a rod slidably carried at one end on said handle and at its opposite end pivotally connected with said tool holder, a spring having one end in engagement with a part on said handle and its opposite end in engagement with said rod, the pressure of said spring against said rod being selectively adjustable by pivotal movement of said handle, and means for retaining said handle in the position for imparting the selectively adjusted pressure of said spring to the disc-sharpening tool.

2. A device for sharpening ground tilling discs rotatably carried on a supporting frame of a farm implement, said device comprising an upstanding flat plate-like support, means for securing said support to a member of the disc-carrying frame, a disc-sharpening tool holder comprising a tubular arm having a bifurcated end pivotally carried on said support, a tool-carrying extension telescopically and adjustably mounted within the free end portion of said tubular arm comprising a shank adjustably slidably and rotatively mounted within said tubular arm, a tool-retaining head at the outer end of said shank, a disc-sharpening tool carried on said head, means for securing said shank and head in adjusted position relatively to the disc being sharpened, and adjustable yieldable pressure-exerting means extending between and carried on said support and said tubular arm for yieldably exerting pressure against said tool while said tool is retained pressed against the peripheral edge portion of the disc during its rotation and sharpening as the implement is propelled over the ground.

3. A disc sharpening device as set forth in claim 2 wherein said adjustable yieldable pressure-exerting means comprises a manually adjustable handle pivotally mounted on said support, a sleeve pivotally mounted on said handle, a rod having one end slidably supported within said sleeve and its opposite end pivotally connected with said tubular arm and having an abutment thereon positioned between said sleeve and its pivoted end, a helical spring through the convolutions of which said rod extends, said spring having one end in abutment with said sleeve and its opposite end in engagement with said abutment on said rod, the pressure of said spring against said rod abutment being selectively adjustable by pivotal movement of said handle, and means for retaining said handle in the adjusted position for imparting the selectively adjusted pressure of said spring to the disc-sharpening tool.

4. A device as set forth in claim 2 wherein said tool is removably secured to said tool-retaining head.

5. A device as set forth in claim 2 wherein said support is provided with a plurality of vertically spaced holes and wherein the bifurcated end of said arm carries a pivot pin which is adapted to be inserted in a selected one of said holes to thereby permit adjustment of disc-sharpening tool holder relatively to the peripheral edge of a disc to be sharpened.

6. A device for sharpening rotatable ground tilling discs of a farm implement, comprising an upstanding flat plate-like support, means for securing said support to said implement, a disc-sharpening tool holder comprising a tubular arm having a bifurcated end pivotally carried on said support, a tool-carrying shank telescopically and rotatively adjustably mounted within the free end portion of said tubular arm, a tool-retaining head at the outer end of said shank, a disc-sharpening tool carried on said head having at least one elongated cutting edge, means for securing said shank and head in adjusted position relatively to the disc to be sharpened, adjustable yieldable pressure-exerting means extending between and carried on said support and on said tubular arm comprising a manually adjustable handle pivotally mounted on said support, a sleeve pivotally mounted on said handle, a rod having one end slidably supported in said sleeve and its opposite end pivotally connected with said tubular arm and having an abutment thereon positioned between said sleeve and its pivoted end, a helical spring through the convolutions of which said rod extends, said spring having one end in abutment with said sleeve and its opposite end in engagement with said abutment on said rod, the pressure of said spring against said rod abutment being selectively adjustable by pivotal movement of said handle, and means for retaining said handle in selectively adjusted position comprising a plurality of spaced holes in said support arranged in an arc whose center is the pivotal center of said handle, said handle having a hole adapted to register with any one of said plurality of holes and a retaining bolt carried in said hole in said handle adapted to be inserted in a selected one of said plurality of holes in said support.

7. A device for sharpening rotatable ground tilling discs of a farm implement as set forth in claim 6 wherein the longitudinal axes of said rod and said arm and shank are disposed in a plane which is perpendicular to the plane of the beveled face of the peripheral cutting edge of the disc at the line of contact of the cutting edge of the disc-sharpening tool.

8. A device as set forth in claim 2 wherein said disc-sharpening tool consists of a piece of metal having at least one cutting edge, and wherein said pressure-exerting means consists of a manually adjustable handle pivotally mounted on said support, an elongated rod pivotally carried at one end thereof on said handle and at its opposite end pivotally connected to said tubular arm, resilient means carried on said rod actuable by said handle to exert pressure against said arm, and wherein the longitudinal axes of said rod and of said arm are disposed in a plane which is perpendicular to the plane of the beveled face of the peripheral cutting edge of the disc at the line of contact of the cutting edge of the disc-sharpening tool.

LOREN CECIL PEDDICORD.

REFERENCES CITED

The following references are of record in the file of this patent:

UNITED STATES PATENTS

| Number | Name | Date |
|---|---|---|
| 534,261 | Green | Feb. 19, 1895 |
| 1,003,631 | McCaughey | Sept. 19, 1911 |
| 1,044,137 | Cassady | Nov. 12, 1912 |
| 1,339,043 | Schmidt | May 4, 1920 |
| 1,506,497 | Meyer | Aug. 26, 1924 |
| 1,599,355 | Arthur | Sept. 7, 1926 |
| 1,958,947 | Holliday | May 15, 1934 |